Fig. 1.

Feb. 20, 1940.  F. O'NEILL  2,191,132
GLASSWARE FORMING MACHINE
Filed March 16, 1936   12 Sheets-Sheet 8

INVENTOR.
Frank O'Neill
BY Rile & Hoge
ATTORNEYS.

Feb. 20, 1940. F. O'NEILL 2,191,132
GLASSWARE FORMING MACHINE
Filed March 16, 1936 12 Sheets-Sheet 9

INVENTOR.
Frank O'Neill
BY
Rule & Hoge
ATTORNEYS.

Feb. 20, 1940. F. O'NEILL 2,191,132
GLASSWARE FORMING MACHINE
Filed March 16, 1936 12 Sheets-Sheet 10

INVENTOR.
Frank O'Neill
BY
Rule & Hog
ATTORNEYS.

Patented Feb. 20, 1940

2,191,132

UNITED STATES PATENT OFFICE 2,191,132

GLASSWARE FORMING MACHINE

Frank O'Neill, Miami Beach, Fla., assignor to Owens-Illinois Glass Company, a corporation of Ohio Application March 16, 1936, Serial No. 69,070

9 Claims. (Cl. 49—5)

The present invention relates to improvements in glassware forming machines and more particularly to that type comprising blank and finishing mold tables arranged side by side and rotating continuously about separate vertical axes and in which mold charges of molten glass are gathered by suction blank molds from the exposed surface of a pool of molten glass over which the molds travel in succession.

In machines of the above character, the gathered mold charges are transformed into blanks or parisons in a well-known fashion and during travel through a zone substantially between the blank and finishing mold tables, the blanks or parisons are transferred to finishing molds in which final expansion and shaping of the articles being produced, takes place.

An object of the present invention is the provision of a generally simplified and improved structure in the blank mold unit whereby to improve the quality of the glassware produced, materially increase the production speed and reduce the amount of "off-ware."

It is also an object to provide novel means for releasably locking the blank mold sections in closed position.

Another object is the provision of novel air and vacuum control means particularly adapted for use in conjunction wtih blank mold units which in effect are mounted upon bell crank levers pivoted to a rotary mold carriage or table.

Another object is the provision in a machine of the above character of novel means for supporting and actuating the charge severing mechanism or "cut-off knife."

A further object is the provision of a safety device which operates automatically under abnormal conditions to prevent dipping of the blank molds into charging contact with the supply body of molten glass and stop rotation of the machine.

It is also an object to provide novel means for cooling the neck molds and plunger units. To this end the vacuum system is utilized to cause application of relatively cool outside air to these elements.

Other objects will be in part apparent and in part pointed out hereinafter.

Figure 1:
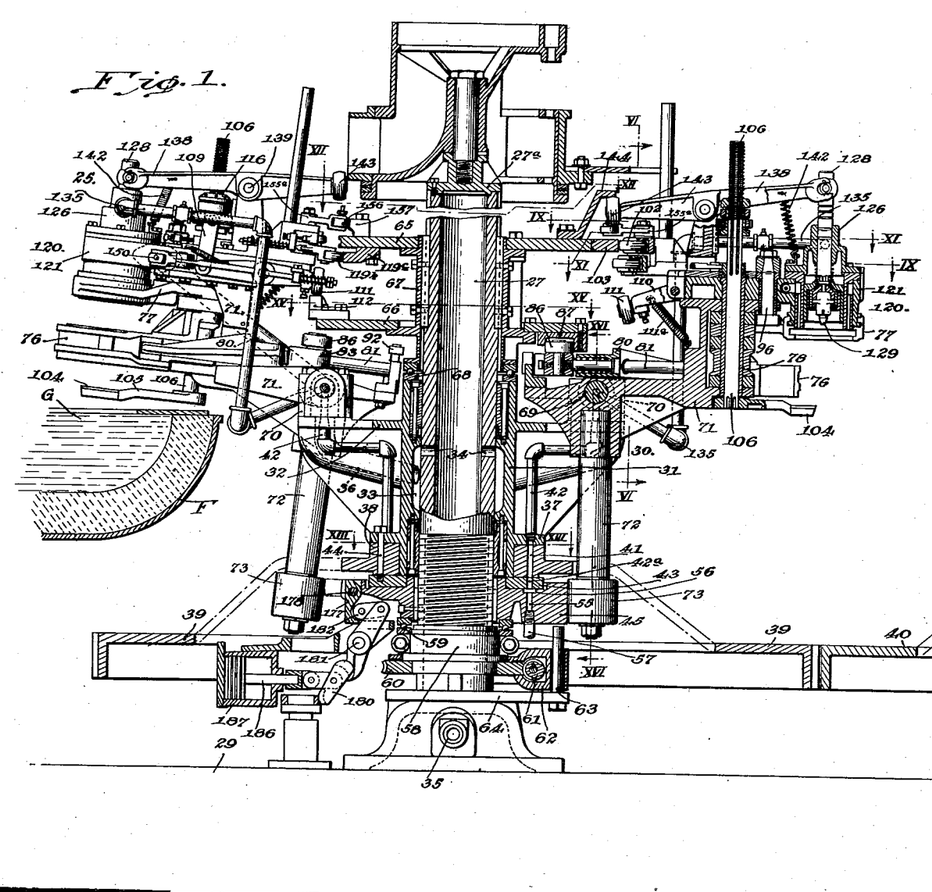
Fig. 1 is a vertical sectional elevational view of the blank mold carriage or table and a fragment of the lower part of the finishing mold carriage.
Figure 2:
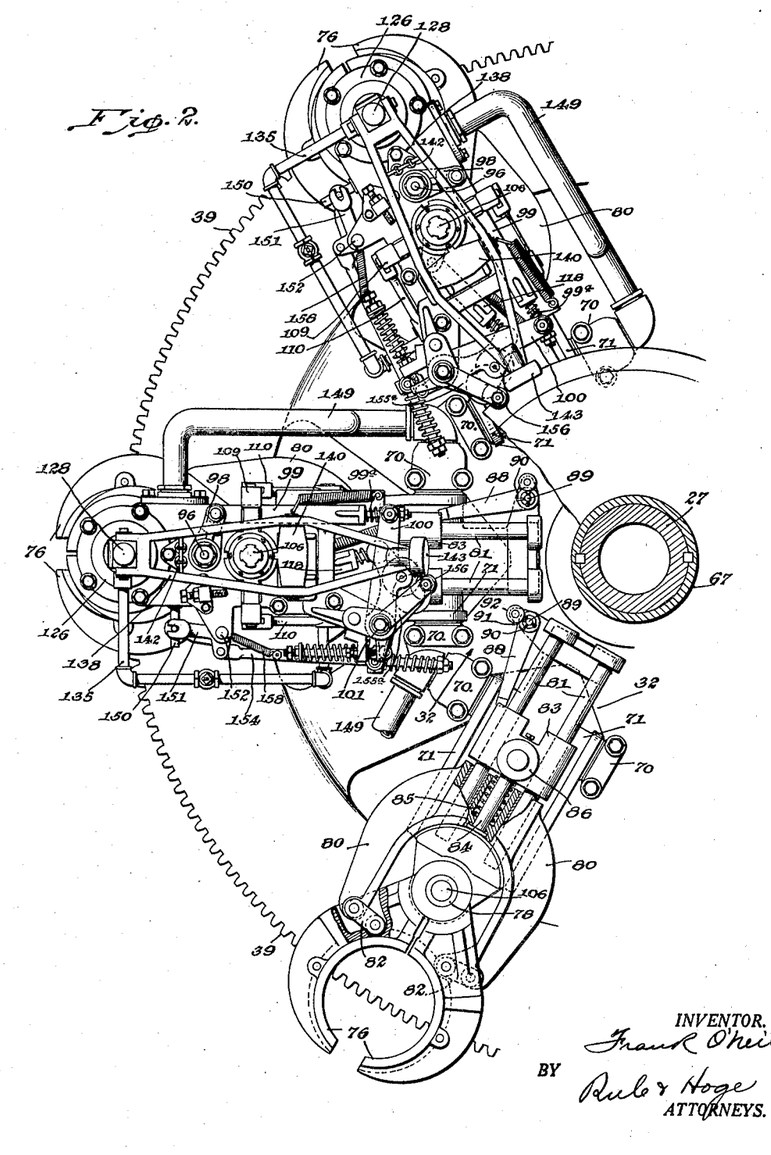
Fig. 2 is a fragmentary plan view with parts in section showing three mold groups and taken at three different elevations.

In more or less general terms the machine comprises an annular series of blank units 25 and an annular series of finishing mold units 26, said units being mounted for continuous rotation about separate vertical axes. The blank mold units move about a vertical column 27 while the finishing mold units rotate about a vertical column 28. Both of these columns 27 and 28 rise from a horizontal base 29 (Fig. 1). A single driving means imparts continuous rotary movement to both series of mold units. The blank mold units, which are of the suction gathering type, are brought into contact with a supply body of molten glass in succession. The mold charges of glass are transformed into blanks or parisons which are transferred to the finishing mold units 26 and therein expanded to the form of the finished articles. The present invention is restricted to improvements in the blank mold table and driving mechanism, in view of which, no attempt has been made to illustrate details of the finishing mold units or their supporting carriage.

The blank mold carriage 30 (Fig. 1) is mounted for rotation about the lower portion of the hollow central vertical column 27 and includes a hollow hub 31 and a spider 32 formed integral with the upper end of the hub and adapted to directly support the series of blank mold units 25. The inner portion of the surface of the hub is recessed to provide a supplemental vacuum chamber 33 which encircles the central column and communicates with the vacuum chamber within and formed by the column by way of ports 34 or passageways. A cap 27ª closes the upper end of the column. The chamber within the column 27 is connected to a vacuum pump (not shown) or other source of supply of vacuum by way of a pipe 35 which opens into the otherwise closed bottom end of the column. Upwardly inclined radial passageways 36 or conduits formed in the spider 32, constitute a part of the means for applying vacuum or suction to the blank mold units as will be apparent hereinafter. A radial flange 37 near the lower end of the hub 31 is bolted or otherwise rigidly secured to the hub 38 of a ring gear 39 which hub constitutes part of an air flow control unit. The gear 39 runs in mesh with a ring gear 40 whereby the two series of mold units may be driven in synchronism by means which will be described presently. The ring gear 40 forms part of a finishing mold table or carrier (not shown). An annular series of vertical passageways 41 in the hub portion 38 of the ring gear 39, provide communication between air pressure supply pipes 42 individual to the blank mold units 25 and vertical ports 42ª in a rotary valve plate 43, the latter being secured to the hub portion 38 by means of bolts 44 whereby said valve plate, hub, and gear rotate together as a single unit relative to the central column 27 and a cam 45 which is designed to control the dipping movements of the blank mold units in addition to forming a part of the air flow control unit.

This cam 45, in addition to controlling the dipping movements of the blank mold units as will be apparent presently, embodies means for establishing communication between the air pipes 42 and a source of supply of air under pressure utilized in the usual compression blow and puff as well as communication between the air pipes 42 and a vacuum supply pipe 57 utilized in a subsequent plunger cooling operation as will appear hereinafter. A series of vertical ports 46 (Fig. 17) grouped together and extending through the cam 45, establish communication between a series of air pipes 47 and the port 42ª in said valve plate 43. These pipes 47 are connected through valves 49 individual thereto, to a header 48 which in turn communicates with air pressure supply pipe 50. Thus any number of the ports 46 may be rendered effective and thereby permit regulation and control of the duration of the application of air under pressure to the molds for the purpose of compacting the gathered charges therein.

A short distance beyond the ports 46 or passageways in the cam 45, two additional ports 51 are provided, said ports being spaced apart circumferentially of the carriage and connected through valves 52 to a header 53, which in turn is connected to an air pressure supply pipe 54. These two valves 52 are intended to be opened one at a time, so that either an early or late puff of air may be introduced into the blanks or parisons after the body blank mold opens and while the blank or parison is suspended from the neck mold in advance of the actual transferring of the blank or parison to the finishing mold. This is conventional practice. Beyond the transfer zone T (Fig. 17), the cam 45 is formed with a vertical bore 55 opening at its upper end into an arcuate upwardly facing channel 56 and communicating at its lower end with a vacuum supply pipe 57 by means of which the aforesaid plunger cooling operation is effected.

Adjustment of the mold carriage vertically on the central column 27 to compensate for variations in the length of molds used so that they will properly contact the supply body of glass, during the charging operation, is obtained by mechanism including a collar 58 which is threaded onto the stationary column and spaced from the cam 45 by a thrust bearing 59. A ring gear 60 below said collar 58 runs in mesh with an adjusting worm 61 which is suitably enclosed in a housing 62, the latter being held against rotation by a pin 63 extending upwardly through an opening therein from a stationary plate 64.

Upper and lower cam plates 65 and 66 respectively are arranged above the hub 31 and carried by a nonrotatable collar 67 which is keyed to the central column 27 so that it is free to move vertically with adjustment of the mold carriage and at all times occupy an operative position relative to the mold groups. A thrust bearing 68 is interposed between said hub 31 and the collar 67 for obvious reasons. Cams referred to hereinafter are mounted upon the cam plates 65 and 66 and serve to actuate the various mechanisms making up the blank mold units or groups 25 as will be apparent from the following description.

Inasmuch as all of the blank mold units 25 are identical in construction and operation, the following description will be directed to a single unit or group. Each unit is mounted upon a horizontal hinge pin 69 which is supported in bearings 70 on the spider 32, said unit including a head casting 24 secured to a rockable frame 71, which at its inner end is connected to a lever 72. This lever extends downwardly from the frame 71 and at its lower end carries a cam roll 73 which rides upon the face of the dip cam 45. Partible body blank and neck molds 74 and 75 respectively are mounted at the outer end of the frame 71, such mounting being effected through body blank mold arms 76 and neck mold arms 77 which are pivoted upon a vertical tubular hinge pin 78. This hinge pin is mounted in vertically spaced bearings 79.

Opening and closing the body blank mold 74 is obtained by cam operated mechanism (Figs. 1 to 5, both inclusive) including a substantially U-shaped slide 80 mounted upon a pair of parallel horizontal guide rods 81 which are supported on the upper side of the rockable frame 71. This U-shaped frame 80 is connected at the outer end of its arms to the body blank mold arms 76 through links 82. At its inner end, the frame 80 is yieldingly connected to a cam actuated slide block 83 by means of a guide rod 84 and spring 85, the latter encircling the rod 84 and confined between the cam slide block 83 and a part of the frame 80 and operating to yieldingly hold these parts separated. A cam roll 86 on the slide block 83 is adapted for engagement with a stationary box cam 87, which is mounted upon the cam plate 66 and shaped to impart radial movement to the slide block 83 and frame 80 so that the body blank mold may be opened and closed at regular time intervals.

Figure 15:
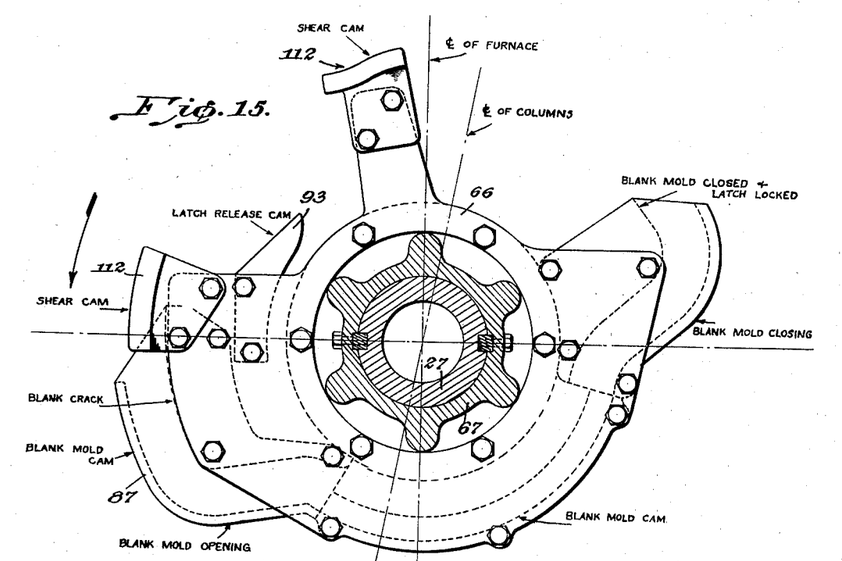
Fig. 15 is a sectional plan view taken along the line XV—XV of Fig. 1.
Figure 16:
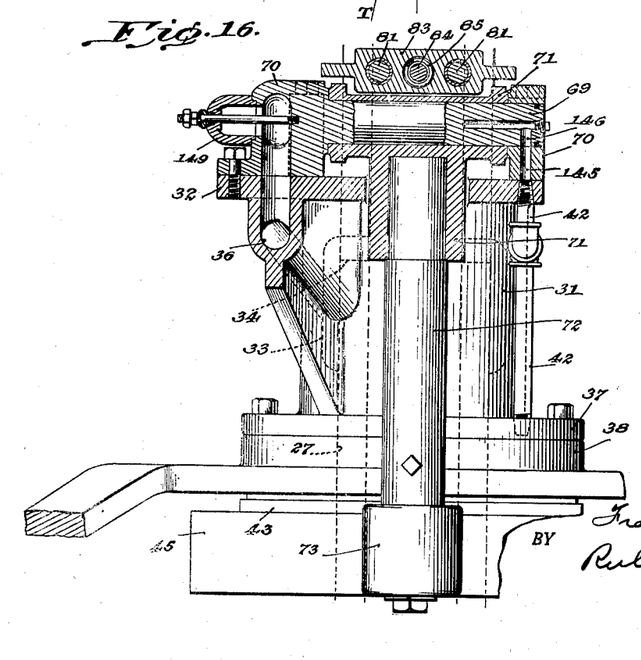
Fig. 16 is a vertical sectional elevational view taken substantially along the line XVI—XVI of Fig. 1.

In order to securely hold the body blank mold closed during the desired periods of operation, a releasable latch 88 is arranged to lock the cam slide block 83 against inward movement except when so moved by the cam 87. This latch 88 (Figs. 2 and 5), extends along side of one of the guide rods 81 and at its inner end is pivoted to vertical hinge pin 89. A coil spring 90 encircles the hinge pin and exerts a pressure on the latch tending to hold it in engagement with the inner end of the cam slide block 83. A roller carrying arm 91 disposed substantially at right angles to the latch 88 is formed integral with the inner end of the latter and in such position that the roller 92 at the proper time, is brought into engagement with at latch release cam 93 (Fig. 15). This cam is attached to the lower side of the cam plate 66 and operates to swing the latch to an inoperative position in opposition to the pressure of the spring 90.

Figure 10:
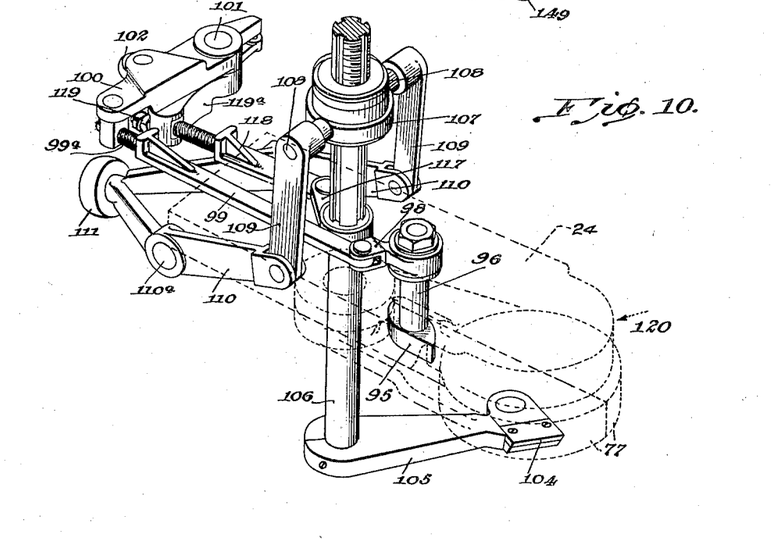
Fig. 10 is a skeleton perspective view showing the knife operating and neck mold opening mechanisms.
Figure 11:
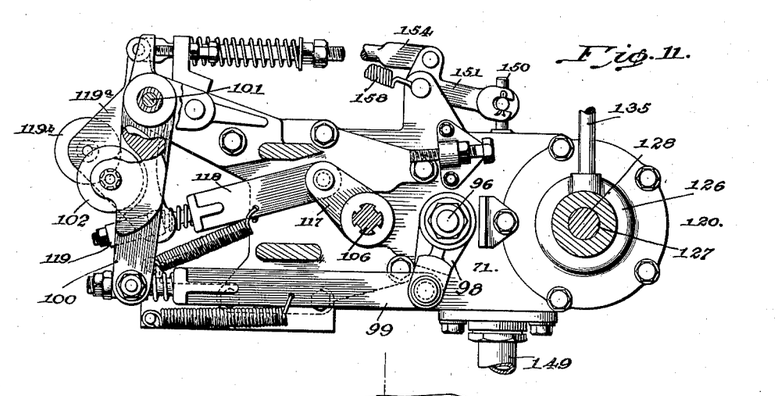
Fig. 11 is a sectional plan view taken substantially along the line XI—XI of Fig. 1.

The neck mold 75 which includes two sections carried by arms 77, as brought out heretofore, is normally held closed by a coil spring 94 which connects the two arms 77. Means for opening the neck mold in opposition to the spring tension comprises a spreader 95 (Figs. 3, 4 and 10) disposed between the neck mold arms 77. This spreader assumes the form of a pair of radially extending diametrically opposed fingers at the lower end of a vertical rock shaft 96 which is journaled in a bearing sleeve 97, said rock shaft carrying an arm 98 at its upper end. A connector 99 and coil spring 99ª provide operating connection between said lever 98 and the free end of a horizontally swingable arm 100, the latter pivoted at its other end to a vertical hinge pin 101 which is mounted upon an upper part of the frame 71. This arm 100 carries a cam roll 102 positioned to engage a cam 103 disposed at the periphery of the upper cam plate 65. This cam 103 is shaped to open the neck mold 75 substantially at the blank transfer position between the two mold carriages or tables.

Charge severing means by which excess glass is severed from a gathered mold charge in the blank mold, includes a cut-off knife 104 (Fig. 10) attached to the outer end of an arm 105 or holder which in turn is supported at the lower end of a vertical rock shaft 106 extending upwardly through the hollow mold hinge pin 78. The upper end portion of the shaft extending above the upper bearing 79 is oscillatively connected to a collar 107 which in turn is pivoted through a pair of diametrically opposed hinge pins 108 to a pair of depending links 109, the latter having pivotal connection with a pair of levers 110. These levers are pivoted to hinge pins 110ª on the frame 71 and have their free ends joined together and at their point of juncture, carry a cam roll 111 which periodically engages a cam 112 mounted upon the upper side of the cam plate 66. This cam 112 operates through said links and levers to impart axial movement to the rock shaft 106 and therethrough correspondingly change the position of the cut-off knife 104 with respect to the blank mold. A coil spring 111ª normally holds the knife 104 in its uppermost position at one side of the mold.

Adjustment of the normal position of the cut-off knife in the direction of the length of the rock shaft to thereby compensate for differences in the length of the blank molds being used is obtained by moving the collar 107 (Figs. 3 and 10) axially on said rock shaft. This is accomplished by rotatively supporting the collar 107 upon a flanged sleeve 113 which at its upper end is threaded upon the rock shaft 106. The collar 107 is held against rotation by means of a key 114, one edge of which slidingly fits into a channel 115 formed in the periphery of said collar. By rotating the sleeve 113, elevation of the rock shaft 106 and knife arm or holder 105 may be changed as circumstances require. A lock nut 116 is threaded upon the rock shaft and utilized to secure the flanged sleeve in any adjusted position.

Swinging of the cut-off knife is obtained by mechanism including an arm 117 splined to the rock shaft 106 and connected to a push rod 118 which through a yielding connector 119 is secured to a lever 119ª, the latter carrying a cam roll 119ᵇ designed for engagement with a cam 119ᶜ at regular time intervals.

Figures 3, 4:
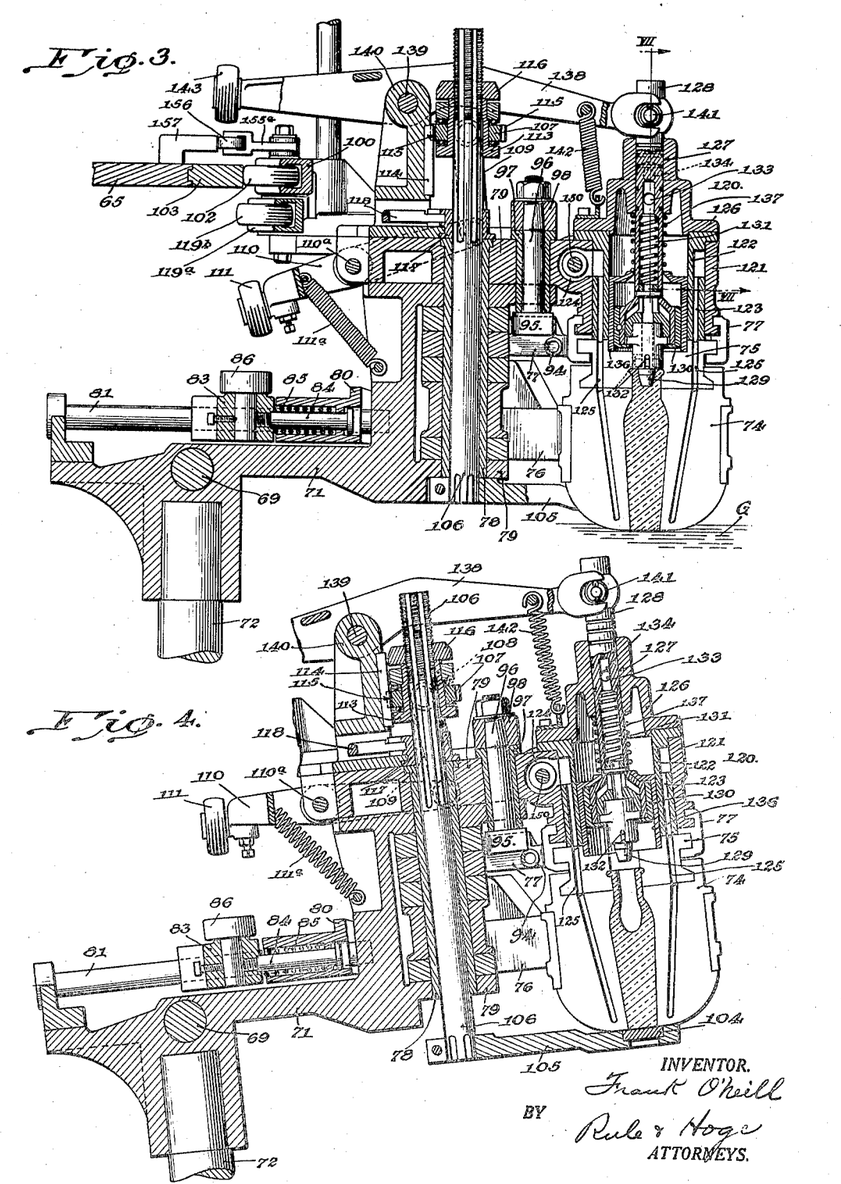
Fig. 3 is a detail sectional view of one of the blank mold units in charging position.
Fig. 4 is a view similar to Fig. 3 but shows the condition of the mold charge and position of the plunger mechanism shortly after the gathering operation.
Figure 5:
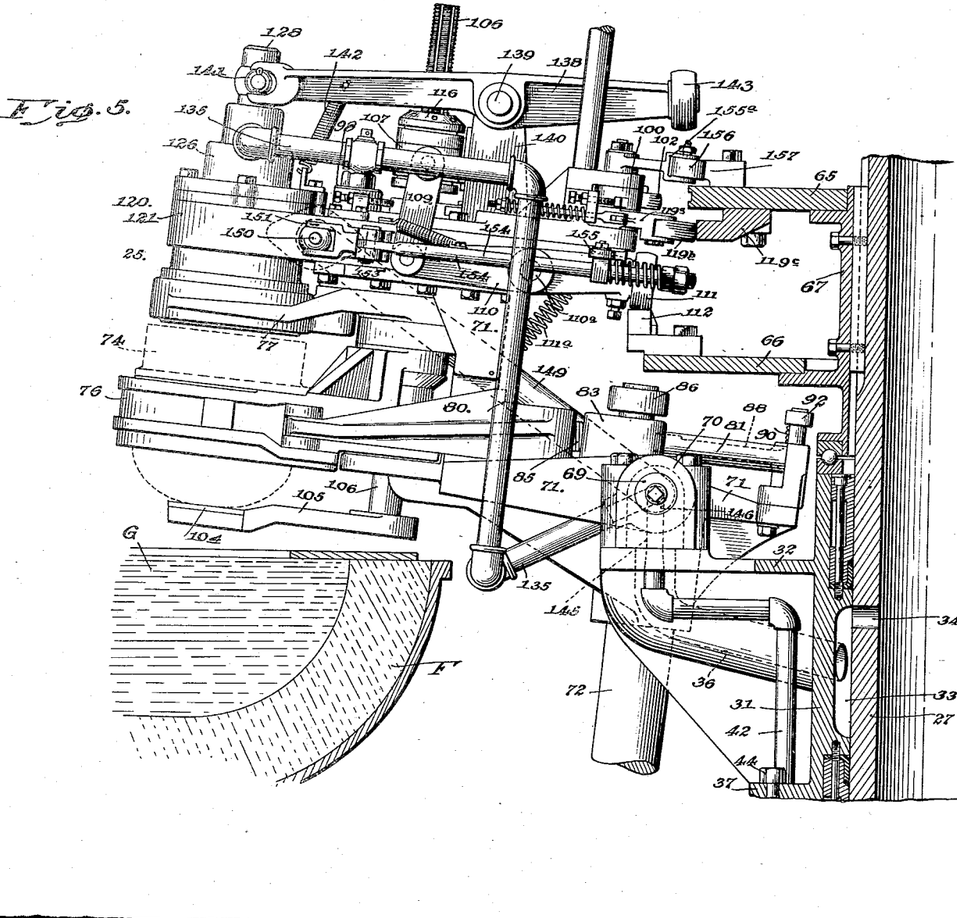
Fig. 5 is a detail side elevational view with parts in section of one of the mold groups mounted upon the mold carriage and central column.
Figures 6, 7, 8:
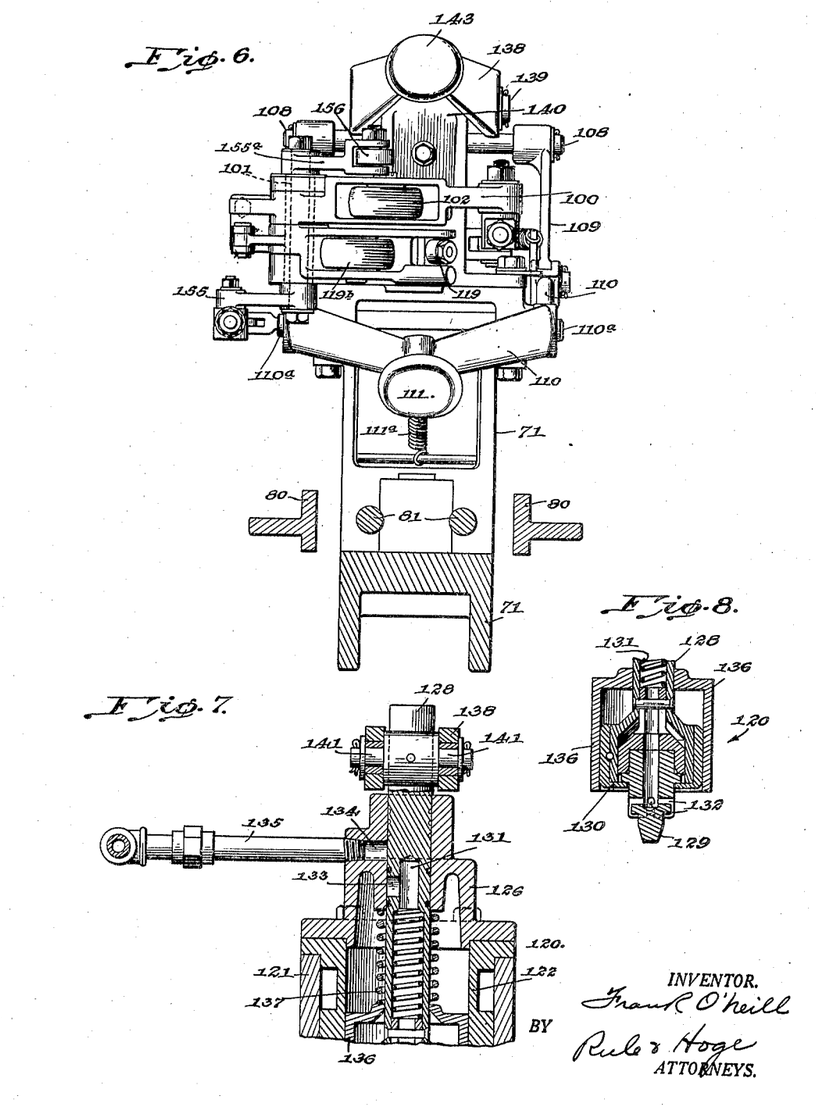
Fig. 6 is a sectional elevational view taken substantially along the line VI—VI of Fig. 1.
Fig. 7 is a sectional view taken substantially along the line VII—VII of Fig. 3.
Fig. 8 is a sectional view taken in the same plane as Fig. 7, but showing the bottom portion of the unit which is partially illustrated in Fig. 7.
Figure 9:
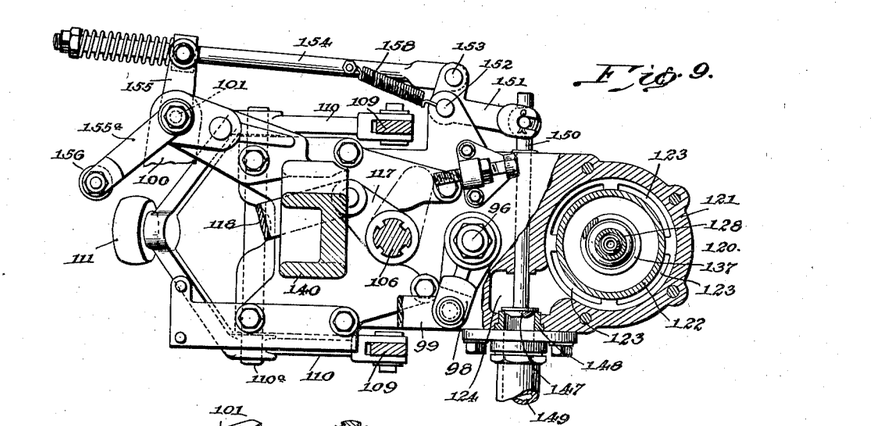
Fig. 9 is a sectional plan view taken substantially along the line IX—IX of Fig. 1.

A combined gathering blowing head and plunger head 120 (Figs 1 to 5 and 7, 8, and 9) comprises a vertical cylinder 121 formed integral with the head casting 24. This cylinder 121 is axially aligned with and disposed above the body blank and neck molds and as shown in Figs. 3 and 4, has holding and sealing engagement with the neck mold arms 77. A sleeve 122 within the cylinder 121 is formed with cored passageways 123 or conduits which establish communication between a vacuum chamber 124 and vacuum slots 125 in the meeting faces of the body blank and neck molds. The upper end of the sleeve 122 is closed by a cap 126 or cover which includes an axial vertical guide opening 127 accommodating a plunger rod 128. This rod in addition to supporting the plunger 129, functions as an air control valve in a manner which will be apparent presently. A holder 130 yieldingly connected to the lower end of the rod 128 is separably connected to the plunger 129. This plunger rod 128 is formed with an axial passageway 131 or conduit opening at its lower end through radial ports 132 in a part of the plunger 129, and at its upper end, through a radial port 133, the latter being intended for periodic registration with an air inlet port 134. This inlet port is directly connected with an air pressure supply pipe 135 (Figs. 1, 5 and 7). A cylindrical inverted cup-like housing 136 partly encloses the plunger holder 130 and is arranged within the sleeve 122. The lower end of the housing is adapted for sealing contact with the adjacent surface of the neck mold 75 being yieldably held in contact therewith by a coil spring 137 which encircles the plunger rod 128 as shown in Figs. 3, 4 and 7.

Vertical movement of the plunger rod 128 and the above described elements connected thereto is obtained by means including a lever 138 pivoted to a horizontal hinge pin 139 mounted in a bracket 140 on the frame 71, said lever having its outer end forked and connected to the trunnions 141 at the upper end of the plunger rod 128. A spring 142 connecting the outer portion of the lever 138 and the cylinder head 126, yieldingly holds the plunger rod and elements carried thereby in their lowermost positions so that the port 133 is positioned out of register with the air inlet port 134. A cam roll 143 at the inner end of the lever 138 is intended for periodic engagement with a stationary cam 144 which is mounted upon the upper side of the upper cam plate 65. This cam 144 is of such contour as to move the plunger rod and elements carried thereby, upwardly at the proper time during each cycle of operations so that the port 133 in said rod and air inlet port 134 (Fig. 7) will be brought into register with each other and permit the introduction of air under pressure to the neck mold cavity. It will be understood that registration of these two ports constitutes only a part of the air flow control inasmuch as it is also necessary to establish communication between the air supply pipe 42 (Fig. 1) and one or more of the pipes 47 (Fig. 17) in order to obtain flow of air under pressure to the neck mold cavity.

The air supply pipe 135 (Figs. 1 and 5) communicates with a pipe 42 by way of ports 145 in the bearing 70 and ports 146 in the corresponding hinge pin 69. During a certain portion of each cycle of operations, the air supply pipes 42 and 135 are brought one at a time into communication with the vacuum supply pipe 57 (Fig. 1) and at the same time, the corresponding plunger rod 128 is positioned to align the ports 133 and 134. With the parts so positioned, outside air is drawn into the passageway in the plunger rod by way of the radial ports 132. This results in effective cooling of the plunger and parts in proximity thereto.

Figure 12:
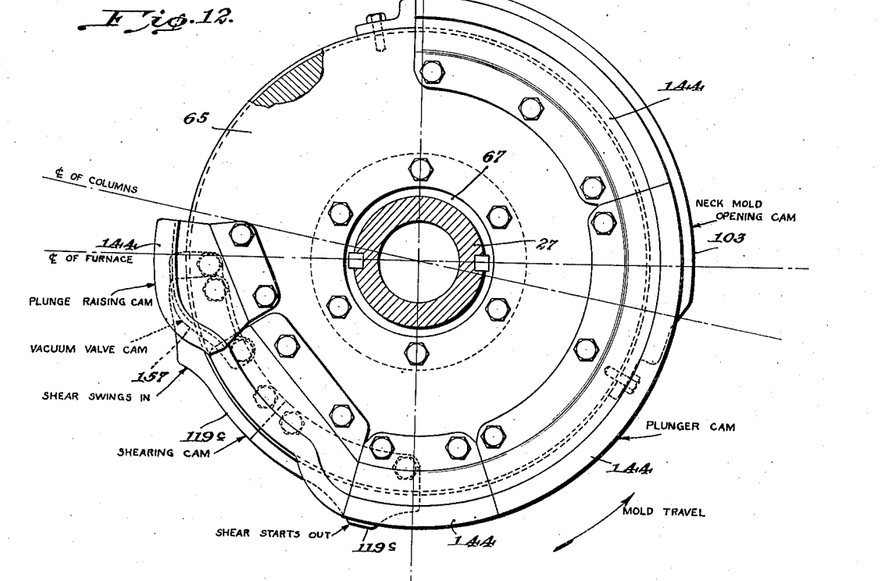
Fig. 12 is a sectional plan view taken along the line XII—XII of Fig. 1.
Figure 13:
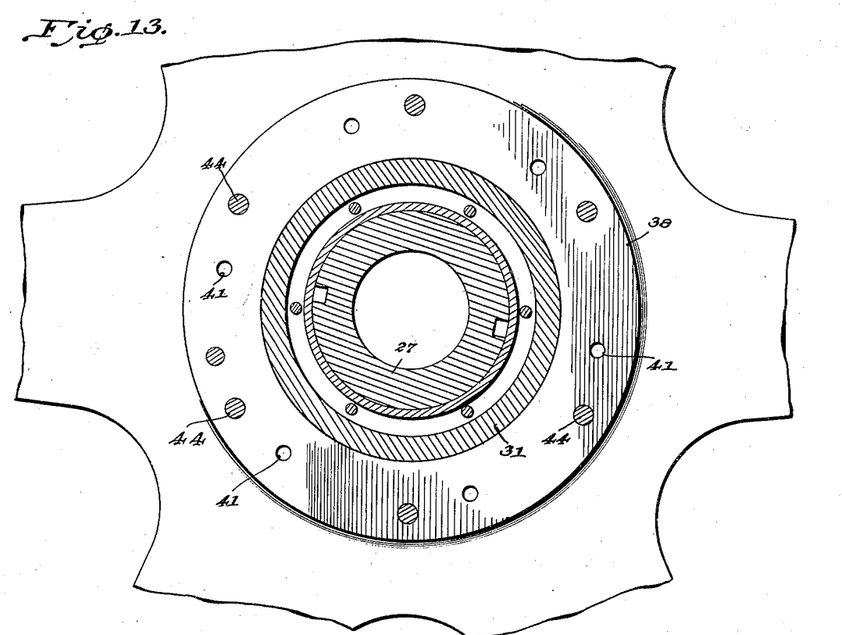
Fig. 13 is a sectional plan view taken along the line XIII—XIII of Fig. 1.
Figure 14:
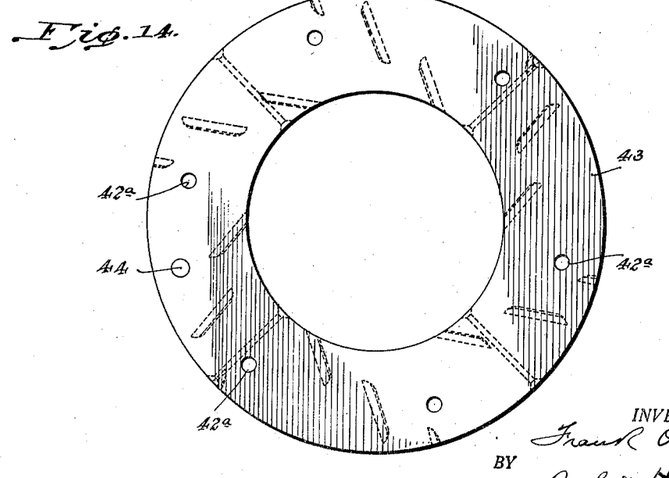
Fig. 14 is a detail plan view of a rotary valve member which in part controls the application of air and vacuum to the mold groups.

Vacuum is applied to the body blank and neck mold cavities at regular time intervals for the purpose of gathering a mold charge of molten glass from a supply body of glass G in a stationary forebay F or the like container. The mechanism providing for such application of vacuum includes a valve 147 disposed within the chamber 124 (Figs. 3, 4 and 9), said valve normally contacting a seat 148 at one end of a vacuum line 149 or pipe, which may be connected in the fashion shown in Fig. 1 to the conduit 36 or passageway formed in the mold carriage. The valve 147 is mounted at one end of a horizontally disposed valve stem 150 or rod which extends through one side wall of the vacuum chamber 124 (Fig. 9) where it is connected to a bell crank lever 151, the latter pivoted to a vertical hinge pin 152 which in turn is connected through a hinge pin 153 to a push rod 154. This rod 154 is yieldingly connected to a lever 155 which is pivoted to the lower end of the vertical hinge pin 101. A lever 155ª at the upper end of said pin carries a cam roll 156 intended for periodic engagement with a stationary cam 157 (Figs. 5 and 12) which is mounted upon the upper side of the upper cam plate 65. This cam 157 operates to open the valve during at least a part of the time that the corresponding blank mold is in its charging position. Immediately after the cam roll moves out of engagement with the cam 157, the valve 147 is closed by means of a coil pull spring 158.

Figure 20:
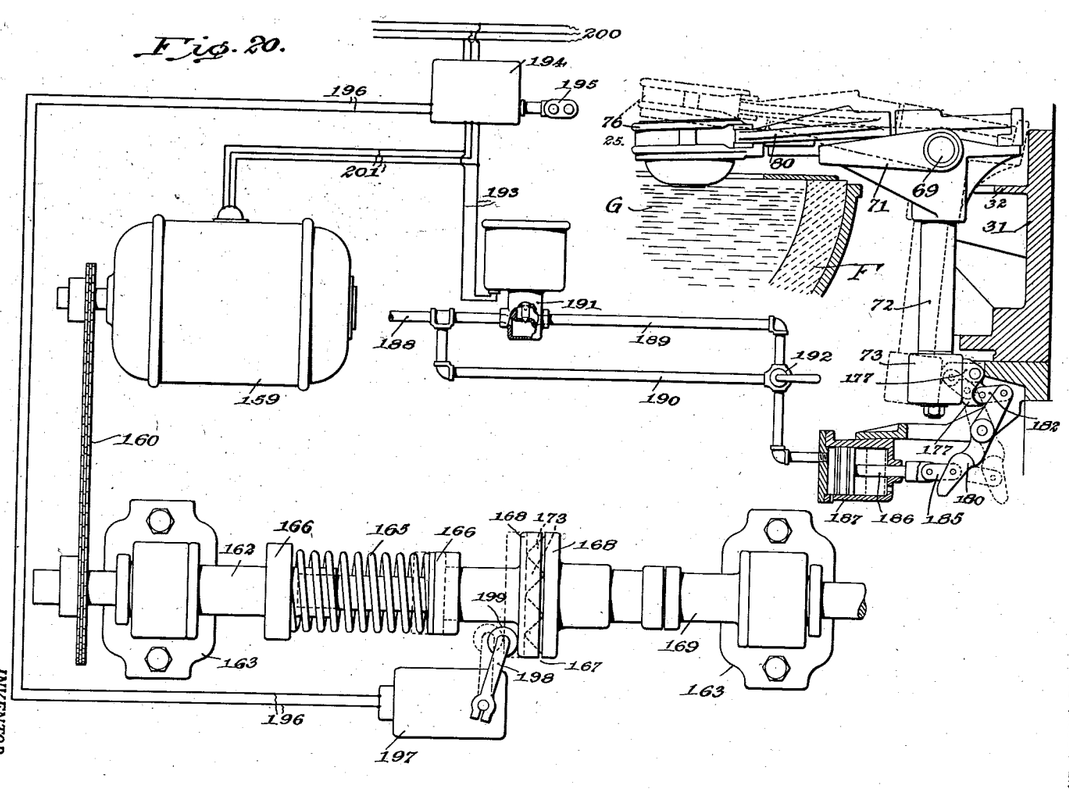
Fig. 20 is a diagrammatic view intended to illustrate the safety feature by means of which the machine is automatically stopped when any jamming occurs and the dip cam automatically actuated to prevent gathering of glass until the abnormal conditions have been corrected.

The drive mechanism operates to rotate the two mold tables continuously and includes means for rendering it inoperative in the event any part of the mechanism becomes jammed or an excessive load is placed upon said drive mechanism. The structure (Fig. 17) includes an electric motor 159 connected through a sprocket chain 160 or the like to a speed reduction unit 161, this unit being in turn connected to a shaft 162 journaled in a bearing 163 on the base 29. This shaft 162 includes a section 164 having a portion telescoped within the main part of the shaft 162. A coil spring 165 is interposed between flanges 166 on the shaft sections and connected to said flanges to provide driving connection between said two shaft sections. A clutch 167 consisting of a pair of heads 168 provides driving connection between the shaft 162 and a shaft 169 which operates through a worm 170 and worm gear 171 to drive a pinion 172 which runs in mesh with the ring gear 39. The clutch heads 168 (Fig. 20) include inter-engaging fingers 173 through which driving connection between the two heads is effected. These fingers have tapered side walls facilitating separation of the heads in the event an abnormal load is imposed upon the shaft 169 as for example, by jamming of any of the mechanisms. Separation of the heads operates a limit switch 197 to stop motor 159, open solenoid valve 191 and thereby actuate the dip cam section 177. The amount of overload necessary to effect separation of the heads incident to stopping the machine is determined by the normal compression of the spring 165. The location of the flanges 166 along the shaft 162 governs this compression.

Manual adjustment of the tables about their axes is provided for by mechanism including a bevel pinion 174 at one end of the shaft 169, said pinion meshing with a pinion 175, carried by a short shaft 176, the outer end of which is adapted to be engaged by a crank (not shown) when it is desired to shift the tables about their axes to facilitate adjustment, repair and/or replacement of any of the parts Application of excessive driving pressure to the clutch heads 168 (Figs. 17 and 20) causes separation thereof and operates to prevent dipping of the blank molds into contact with the molten glass and to quickly remove a blank mold from contact with the glass in the event any mechanisms become jammed during a charging operation. As has been brought out heretofore, the positions of the blank mold units during their rotation about the central column 27, are controlled and regulated by the dip cam 45, said cam for the greater part being shaped to support the blank molds in a vertical position with their axes parallel with that of the central column 27 at the charging position. This cam includes a hinged dip section 177 mounted upon a horizontal hinge pin 178, said section having its outer face 179 shaped to effect lowering of the blank molds into contact with the glass for the gathering operation and thereafter lifting of the molds in order that they may clear the forebay F. Upon separation of the clutch heads 168, mechanism is operated to swing the dip cam section 177 to the dotted line position shown in Figs. 1 and 20 in which position it will prevent the blank molds from coming into contact with the glass G. This mechanism includes a lever 180 pivoted to a horizontal hinge pin 181 and connected at its upper end through a link 182 to a lower part of the dip cam section 177. A finger 183 at the other end of the lever 180 is adapted for engagement with a stop 184. These two elements cooperate in holding the dip cam section 177 in the full line position shown in Figs. 1, 18 and 20. A link 185 connects the lever 180 to the piston rod 186 of an air motor 187. This air motor is of the piston type and operates, when circumstances warrant it, to swing the dip cam section 177 to the dotted line position shown. Operative connection between the clutch 167 and piston motor 187 may include the following structure:

An air pressure supply pipe 188 is connected to one end of the piston motor 187 by way of pipes 189 and 190. A solenoid controlled valve 191 in the pipe 189 is intended to be actuated automatically by disengagement of the clutch heads 168 and consequent shuttting off of power supply to the motor 159 to permit the flow of air under pressure to the piston motor. The pipe 190 is connected to the main supply pipe 188 in advance of the solenoid operated valve 191 and at its other end is connected to a three-way valve 192. This valve 192 is operable manually and independently of the solenoid controlled valve 191 so that in the event the operator wishes to rotate the tables without bringing the molds into contact with the glass, he may do so by simply manipulating the valve 192 to admit air under pressure to the piston motor 187. Ordinarily the valve 192 is positioned to establish communication between the friction motor and the pipe 189.

The solenoid controlled valve 191 is connected through a pair of conductors 193 to a junction box 194 in proximity to a starter switch 195. Conductors 196 connect the junction box 194 and a limit switch 197 of conventional or any preferred type including a switch arm 198 having a roller 199 at its outer end intended for continuous rolling contact with one of the clutch heads 168. The junction box 194 is connected to main lines 200 and through lines 201 to the electric motor 159.

In operation, the starter switch 195 is manipulated to permit operation of the motor 159 which in turn operates through the shafts and clutch to continuously rotate the blank and finishing mold tables through the ring gears 39 and 40. Manipulation of the starter switch 195 also automatically causes solenoid valve 191 to assume a closed position, thereby cutting off air pressure motor 187 and allowing dip cam section 177 to return to the normal position where it permits dipping of the blank molds. The blank mold table moves counter-clockwise and thereby brings the blank mold units in succession to the charging position where they are lowered into charging contact with the pool of molten glass G. During the charge gathering operation, the elements of the blank mold unit are relatively positioned substantially as shown in Fig. 3, wherein the plunger 129 is projected into the neck mold cavity and the cut-off knife is disposed at one side of and slightly above the lower end of the blank mold. The vacuum valve 147 (Fig. 9) is opened by the cam 157 for a sufficient period of time to permit filling of the body blank and neck mold cavities, the air being exhausted from said cavities by way of the passageway 123 and vacuum slots 125. Immediately after the mold has been charged, the dip cam section 177 swings the frame 71 about the pivot 69 (Fig. 4) thereby removing the mold from contact with the glass.

At this time the cut-off mechanism operates, such operation including lowering of the knife arm 105 under influence of the bell crank lever 110 and lever 109. This is followed immediately by swinging of the knife across the lower end of the blank mold, which swinging is effected by the cam 119ᶜ (Fig. 1) operating through the links and levers 117, 118, 119ᵃ and cam roll 119ᵇ. The knife holder is held in position to close the charging opening of the blank mold until after the plunger 129 has been withdrawn as shown in Fig. 4. Such withdrawal of the plunger is obtained by the cam 144 swinging the lever 138, the latter as stated heretofore, being connected to the plunger rod 128. Movement of the rod is limited to that degree necessary to bring the ports 133 and 134 (Fig. 7) into register with each other so that air under pressure may be introduced into the neck end of the mold charge and thereby compact the glass against the mold walls and knife holder. The duration of the period of application of air under pressure in this fashion and for this purpose is regulably controlled by the series of valves 49 (Fig. 17) which are individual to the ports 46. These ports 46 register with the air supply pipes 42 and as will be obvious, the number of valves 49, which are open, determines the length of time air is introduced into the neck mold.

Upon completion of the compression blow just described, the knife is lowered away from the mold by rocking of the lever 110 under influence of the cam 112 and immediately thereafter, is swung to one side of the mold and again elevated to the position indicated in Fig. 3. The body blank mold 74 is then opened by means of the cam 87 operating through the mechanism already described. Shortly thereafter, the air pipe 42 (Fig. 1) moves into register with the ports 51 (Fig. 17) in succession. These ports are connected to a source of supply of air under pressure through the valves 52 and pipe 54. Through either of these ports, a puff of air may be introduced into the blank or parison to slightly elongate the initial blow opening and prepare the blank or parison for final expansion in the finishing mold (not shown). As is apparent, this puff of air may be applied early or late depending upon the character and requirements of the particular blank or parison and the setting of the valves 52. Shortly after this puff application, the neck mold 75 is opened slightly by means of the cam 103. Substantially at the time the slight opening of the neck mold occurs, the finishing mold (not shown) is closed about the blank or parison which at this particular time is suspended bare from the neck mold. Immediately thereafter, the neck mold is completely opened and simultaneously therewith the blank or parison is completely enclosed in the finishing mold. The blank is then expanded to its final shape.

Figure 17:
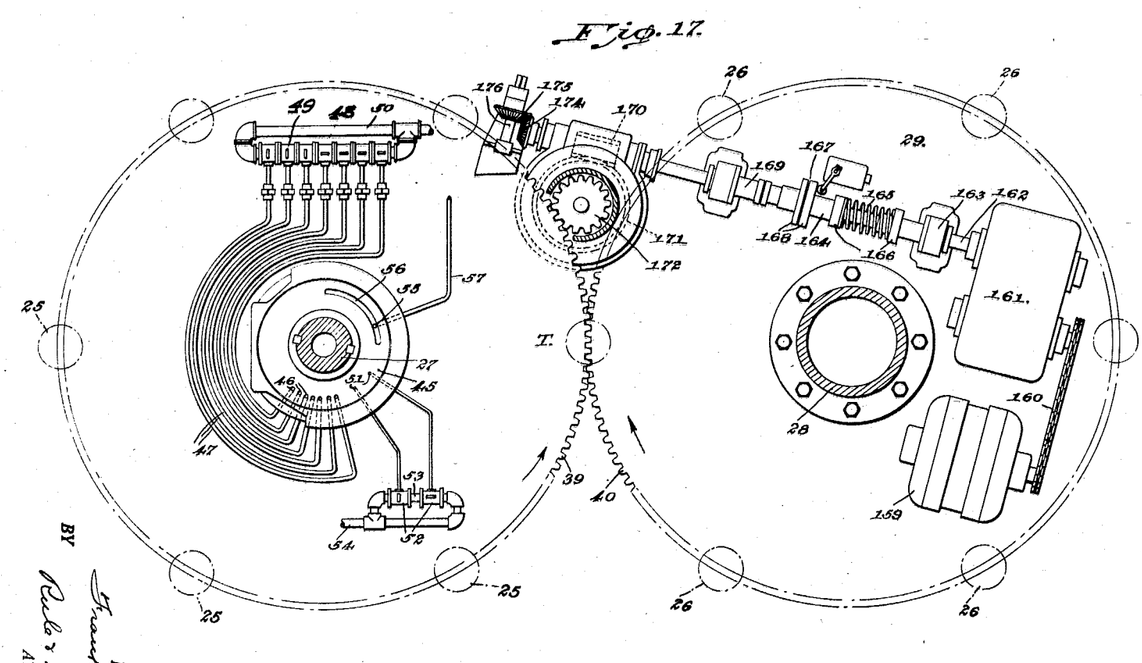
Fig. 17 is a plan view with parts in section illustrating the machine driving mechanism and air supply means.
Figures 18, 19:
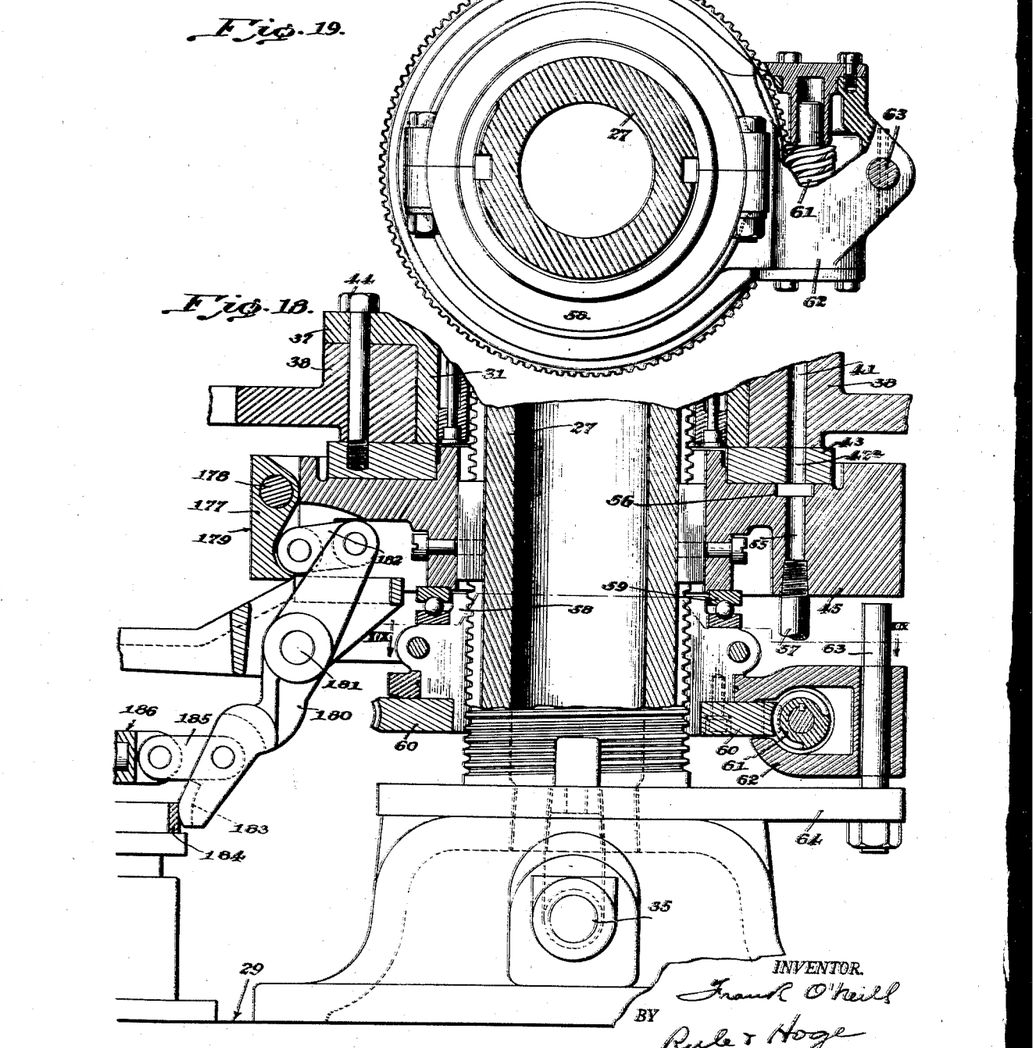
Fig. 18 is a fragmentary sectional elevational view showing in considerable detail the structure at the bottom end of the central column and the mechanism for actuating the dip cam.
Fig. 19 is a sectional plan view taken substantially along the line XIX—XIX of Fig. 18.

The plunger and its holder may then be cooled to some extent by the intake of outside air resulting from establishing communication between the radial ports 132 (Fig. 8) and the vacuum pipe 57 (Fig. 1) by way of the pipes 42, 135, and ports 133 and 134, while at the same time the former pipe 42 moves into register with the slot 56 (Fig. 17). To accomplish this, the plunger holder 128 very obviously must be lifted to bring the ports 133 and 134 into register with each other. The resultant accelerated movement of outside air over the plunger and holder effectively reduces their temperature.

As brought out above, the driving mechanism is of such character that in the event any of the mold units or parts thereof, become jammed and apply excessive pressure or overload to the coil spring 165, the electrical devices referred to, will operate and cause movement of the dip cam section 177 to a position to prevent dipping of the molds into the supply body of glass G. Moreover, the clutch 167 will become inoperative on account of separation of the heads 168 and thereby prevent further operation of the machine. In the event it is desired to rotate the mold tables without dipping of the molds into the glass, the valve 192 (Fig. 20) may be operated to admit air under pressure to the piston motor 187 in the fashion brought out heretofore.

Modifications may be resorted to within the spirit and scope of the appended claims.

I claim:

1. In a glassware forming machine, a blank mold unit including partible cooperating body blank and neck molds, means for opening and closing the molds, a plunger having a conduit therethrough, means for projecting the plunger into the neck mold at intervals, sources of vacuum and air under pressure, means for establishing communication between the conduit and source of air under pressure at times and means for establishing communication between the conduit and source of vacuum while the molds are open whereby to accelerate cooling of the plunger.

2. In a glassware forming machine, a blank mold unit including a partible mold, means for opening and closing the mold, a plunger adapted for cooperation with the mold and having a passageway therethrough, a source of vacuum supply and means for establishing communication between the one end of the passageway and the source of vacuum supply while the mold is open to thereby cause impingement of cooling air over the surface of the plunger and movement of the air through said passageway.

3. In a glassware forming machine, the combination of a rotary blank mold table mounted for movement about a vertical axis, a blank mold carried by said table and mounted for vertical movement thereon, means for rotating the table to thereby move the blank mold through a charging zone at regular time intervals, means including a movable cam section for controlling the vertical position of the mold and causing it to move into and out of charging contact with a supply body of molten glass in said zone, automatic means actuated by a predetermined increase in the load on the table rotating means for moving the cam to a position in which it prevents contact between the mold and supply body of glass, said last named means including a fluid operated piston motor, a plurality of pivoted links operatively connecting the motor and cam, a finger forming a part of one link and a stop positioned to engage and limit movement of the finger in one direction.

4. In a glassware forming machine, a blank forming unit mounted for rotation about a vertical axis and including a frame, a suction type blank mold supported on the frame and consisting of a pair of cooperating sections, a vertical hinge pin supporting the sections, cut-off mechanism including a rock shaft extending through the frame and axially through the hinge pin, a portion of the rock shaft being splined, a cut-off knife secured to the lower end of the shaft, cam operated levers and links connected to the upper end of the shaft for imparting axial movement thereto, an arm connected to the splined portion of the rock shaft, a push rod connected to the arm, and cam means for actuating said push rod whereby the rock shaft is oscillated in timed relation to the axial movement thereof.

5. In a glassware forming machine, a blank forming unit mounted for rotation about a vertical axis and including a frame, a suction type blank mold supported on the frame and consisting of a pair of cooperating sections, a vertical hinge pin supporting the sections, cut-off mechanism including a rock shaft extending through the frame and axially through the hinge pin, the upper end of said rock shaft being threaded, a cut-off knife secured to the lower end of the shaft, a sleeve threaded on the rock shaft, a collar supported on the sleeve, cam operated levers and links connected to the collar for imparting axial movement thereto, and means for oscillating the rock shaft in timed relation to axial movement thereof.

6. In a glassware forming machine, the combination of a rotary blank mold table mounted for movement about a vertical axis, a blank mold carried by said table and mounted for vertical movement thereon, means for rotating the table to thereby move the blank mold through a charging zone at regular time intervals, means including a movable cam section for controlling the vertical position of the mold and causing it to move into and out of charging contact with a supply body of molten glass in said zone, automatic means actuated by a predetermined increase in the load on the table rotating means for moving the cam to a position in which it prevents contact between the mold and supply body of glass, said last named means including a fluid operated piston motor, links operatively connecting the motor to the cam, a sectional drive shaft, means for positively driving one section, separable clutch heads mounted upon the adjacent ends of the shaft sections, interlocking fingers provided on the adjacent faces of said heads, one of said heads being slidingly mounted upon the driven shaft section, yielding means normally holding the heads interengaged, a solenoid valve for controlling the flow of fluid to said piston motor, a limit switch for controlling operation of the valve, and means whereby separation of the clutch heads actuates the limit switch.

7. In a glassware forming machine, a blank mold unit including a partible mold, a combined gathering blowing and plunger head designed for cooperation with the mold including a cylinder, a sleeve within the cylinder having passageways therein communicating with the mold, a cap closing the upper end of the sleeve and having a guide opening therein, a hollow plunger rod slidable in the guide opening, a plunger carried by said rod, a port in the plunger communicating with the interior of the plunger rod, a port in the cap, a port in the plunger rod adapted upon sliding movement of the latter to move into and out of register with the port in the cap, means connecting the port in the cap to a source of air under pressure, means connecting the passageways in the sleeve to a source of vacuum, a valve for controlling the admission of vacuum to said passageways, and means for moving the plunger rod.

8. In a glassware forming machine, a blank mold unit including a partible mold, a combined gathering, blowing and plunger head designed for cooperating with the mold including a cylinder, a sleeve within the cylinder having passageways therein communicating with the mold, a cap closing the upper end of the sleeve and having a vertical guide opening therein, a hollow plunger rod vertically slidable in the guide opening, a plunger carried by said rod, a port in the plunger communicating with the interior of the plunger rod, means for supplying air under pressure to the interior of the plunger rod when the latter is raised and for discontinuing the supply thereof when the rod is lowered, means connecting the passageways in the sleeve to a source of vacuum, a valve for controlling the admission of vacuum to said passageways, and means for raising and lowering the plunger rod.

9. In a glassware forming machine, the combination of a rotary blank mold table mounted for movement about a vertical axis, a blank mold carried by said table and mounted for vertical movement thereon, means for rotating the table to move the blank mold through a charging zone at regular time intervals, means including a dip cam for controlling the vertical position of the mold causing it to move into and out of charging contact with a supply body of glass in said zone, means for applying vacuum to the mold to gather a charge therein, a series of radially spaced ports in the dip cam, a conduit connecting each port independently with a source of air under pressure, a valve in each port, an additional port independently connected to the source of air under pressure in radial alignment with the other ports in the dip cam, a vacuum port connected to a source of vacuum in radial alignment with the other ports in the dip cam, a valve plate rotatable with the table and having a bore therein adapted to register successively with the ports in the dip cam upon rotation of the plate, and means connecting said bore to the blank mold.

FRANK O'NEILL.